(12) United States Patent
Rammer et al.

(10) Patent No.: US 12,467,177 B2
(45) Date of Patent: Nov. 11, 2025

(54) METHOD AND APPARATUS FOR AUTOMATED GAP CONTROL OF A SCARFING ROLL

(71) Applicant: Curt G. Joa, Inc., Sheboygan Falls, WI (US)

(72) Inventors: Megan A. Rammer, Sheboygan Falls, WI (US); Sean P. Follen, Sheboygan Falls, WI (US); Randy J. Teresinski, Jr., Sheboygan Falls, WI (US)

(73) Assignee: CURT G. JOA, INC., Sheboygan Falls, WI (US)

( * ) Notice: Subject to any disclaimer, the term of this patent is extended or adjusted under 35 U.S.C. 154(b) by 0 days.

(21) Appl. No.: 18/881,027

(22) PCT Filed: Jun. 12, 2024

(86) PCT No.: PCT/US2024/033586
§ 371 (c)(1),
(2) Date: Jan. 3, 2025

(87) PCT Pub. No.: WO2024/258951
PCT Pub. Date: Dec. 19, 2024

(65) Prior Publication Data
US 2025/0257509 A1    Aug. 14, 2025

Related U.S. Application Data

(60) Provisional application No. 63/507,839, filed on Jun. 13, 2023.

(51) Int. Cl.
| | |
|---|---|
| *D06C 15/08* | (2006.01) |
| *A61F 13/15* | (2006.01) |
| *D21H 25/00* | (2006.01) |

(52) U.S. Cl.
CPC ........ *D06C 15/08* (2013.01); *A61F 13/15617* (2013.01); *A61F 13/15707* (2013.01);
(Continued)

(58) Field of Classification Search
CPC .............. D06C 15/08; A61F 13/15617; A61F 13/15707; A61F 13/15764
(Continued)

(56) References Cited

U.S. PATENT DOCUMENTS

| | | |
|---|---|---|
| 4,666,647 A | 5/1987 | Enloe |
| 6,627,130 B2 | 9/2003 | Kugler |

(Continued)

FOREIGN PATENT DOCUMENTS

| | | |
|---|---|---|
| BR | 112019020730 B1 | 8/2021 |
| CN | 203736397 U | 7/2014 |

(Continued)

OTHER PUBLICATIONS

International Search Report and Written Opinion for corresponding PCT Application No. PCT/US2024/033586, mailed Oct. 2, 2024.

*Primary Examiner* — Jacob T Minskey
(74) *Attorney, Agent, or Firm* — Quarles & Brady, LLP (57) ABSTRACT

An assembly and method is provided for scarfing a fibrous material with an assembly that provides automated control of a scarf gap. The assembly includes a moveable mount, a driven scarfing roll coupled to the moveable mount, and a scarfing roll lifting assembly coupled to the moveable mount. A first sensor senses contact between the scarfing roll and an external surface and a second sensor senses position of the scarfing roll when information is received from the first sensor that contact of the scarfing roll with the external surface has occurred. A control unit operates the scarfing roll lifting assembly to position the scarfing roll at a desired scarf gap measured from the contact position. The scarfing roll is positioned based on an identified high point of the external surface, such as the external forming surface of a forming drum.

21 Claims, 6 Drawing Sheets

(52) U.S. Cl.
CPC ..... *A61F 13/15764* (2013.01); *D21H 25/005* (2013.01); *A61F 2013/1578* (2013.01); *A61F 2013/15788* (2013.01); *D10B 2509/026* (2013.01)

(58) Field of Classification Search
USPC ........................................................ 264/40.1
See application file for complete search history.

(56) References Cited

U.S. PATENT DOCUMENTS

| | | | |
|---|---|---|---|
| 11,331,224 B2 | 5/2022 | Sato | |
| 11,331,228 B2 | 5/2022 | Van Ingelgem | |
| 11,806,220 B2 | 11/2023 | Van Ingelgem | |
| 2002/0069991 A1* | 6/2002 | Jewitt | D21F 1/32 162/255 |
| 2013/0307174 A1* | 11/2013 | Lindgren | B23Q 9/0014 264/40.1 |
| 2016/0368073 A1* | 12/2016 | Lim | B22D 11/126 |
| 2020/0180787 A1* | 6/2020 | Hafenrichter | G01N 27/90 |

FOREIGN PATENT DOCUMENTS

| | | |
|---|---|---|
| EP | 3403627 B1 | 5/2019 |
| EP | 3634345 A1 | 4/2020 |
| EP | 3711725 A1 | 12/2021 |
| ES | 2743100 T3 | 2/2020 |
| JP | 5401289 B2 | 1/2014 |
| SE | 508745 C2 | 11/1998 |

* cited by examiner

METHOD AND APPARATUS FOR AUTOMATED GAP CONTROL OF A SCARFING ROLL

CROSS-REFERENCE TO RELATED APPLICATIONS

This application is the U.S. National Stage of PCT/US2024/033586 with international filing date of Jun. 12, 2024, and which claims priority U.S. Provisional Application No. 63/507,839 filed Jun. 13, 2023, the contents of which are incorporated by reference in their entireties.

BACKGROUND OF THE DISCLOSURE

The disclosure herein relates to a method and an apparatus for controllably positioning a scarfing roll, which scarfs a fibrous web during the forming of disposable products such as diapers at very high speeds, relative to a forming drum. While the description provided relates to diaper manufacturing, the apparatus and method are easily adaptable to the manufacture of feminine hygiene and adult incontinence products, as well as other applications.

Generally, diapers comprise an absorbent insert or patch and a chassis, which, when the diaper is worn, supports the insert proximate a wearer's body. Additionally, diapers may include other various patches, such as tape tab patches, reusable fasteners and the like. The raw materials used in forming a representative insert are typically cellulose pulp and/or superabsorbent polymers, high internal phase emulsion (HIPE) foams, tissue paper, poly, nonwoven web, acquisition, and elastic, although application specific materials are sometimes utilized. Some of the insert raw materials are provided in roll form and unwound and applied in continuously fed fashion. Other insert raw materials such as superabsorbent polymers and curly fibers, as examples, are provided in non-roll form.

In the creation of a diaper, multiple roll-fed web processes are typically utilized. To create an absorbent insert, the cellulose pulp is unwound from the provided raw material roll and fiberized by a pulp mill. Pulp cores are created using a vacuum forming drum and placed on a continuous tissue web. Optionally, superabsorbent polymers may be added to the pulp core. In other embodiments, the core may be formed solely of superabsorbent polymers and/or of fibers that are provided to the forming system from bales. The cores may be formed on a rotary forming system, on a screen, or utilizing other air-laid technologies.

One or multiple nonwoven web layers may be wrapped around the absorbent material with adhesive optionally utilized to provide integrity and stabilization of the core structure. In other cases, the core is formed, unwrapped, on the vacuum forming assembly. Multiple cores, in wrapped or unwrapped form, may be stacked atop one another to form a multiple core assembly. The formed single or multiple core assembly is debulked by proceeding through a calendar unit, which at least partially compresses the fibrous web, thereby increasing its density and structural integrity. After debulking, the core is optionally passed through a segregation or knife unit, where individual inserts are cut. The inserts are conveyed, at the proper pitch, or spacing, to a combining unit where the inserts are enveloped within a diaper chassis.

In order to maintain the desired core thickness and ensure that the forming drum is not damaged during the scarfing operation via contact between the scarfing roll and the outer forming surface of the forming drum, the distance that the scarfing roll is positioned from the forming drum must be precisely set. Previously, an operator used a hand crank and a feeler gauge to set this distance. This method is time-consuming and does not allow for the distances to be changed during operation.

BRIEF DESCRIPTION OF THE INVENTION

According to an aspect of the invention there is provided a scarfing assembly for a fibrous material. The assembly includes a moveable mount, a driven scarfing roll coupled to the moveable mount, and a scarfing roll lifting assembly coupled to the moveable mount. A first sensor is configured to sense contact between the scarfing roll and an external surface and a second sensor is configured to sense position of the scarfing roll when information is received from the first sensor that contact of the scarfing roll with the external surface has occurred. A control unit is programmed to operate the scarfing roll lifting assembly to position the scarfing roll at a desired scarf gap measured from the contact position.

In embodiments of the invention, the scarfing roll is positioned at least partially within a housing and the scarfing roll lifting assembly causes movement of the scarfing roll relative to the housing.

The first sensor may be a load cell, an optical sensor, or a torque sensor according to embodiments. In embodiments of the invention, the second sensor is an encoder.

In embodiments, a driven forming drum has an outer forming surface onto which a fibrous material is deposited and the scarfing roll is positioned proximate the outer forming surface of the driven forming drum.

In embodiments, the first sensor is configured to sense contact between the scarfing roll and the outer forming surface of a driven forming drum and the second sensor is configured to sense a contact position where the scarfing roll is in contact with the outer forming surface. The control unit is further programmed to control the scarfing roll lifting assembly to position the scarfing roll at the desired scarf gap measured off the contact position.

In embodiments the control unit is programmed to a) move the scarfing roll toward the forming drum; b) record a contact position of the scarfing roll when information is received from the first sensor that contact of the scarfing roll with the outer forming surface has occurred; c) move the scarfing roll away from the forming drum; d) rotate the forming drum to a new rotational position relative to the scarfing roll; e) repeat a) through d) to acquire contact positions at a plurality of rotational positions around a circumference of the forming drum; f) identify a high point on the forming surface from the acquired contact positions; and g) move the scarfing roll to a desired scarf gap position based on the identified high point.

In some embodiments the control unit is programmed to acquire contact positions at a plurality of rotational positions around the entire circumference of the forming drum. In some embodiments the control unit is programmed to identify the high point as the minimum value of the acquired contact positions.

According to another aspect of the invention, there is provided a method of automated gap control of a scarfing roll assembly for a fibrous material comprising the steps of controlling a scarfing roll lifting assembly to move a driven scarfing roll toward a surface external the scarfing roll assembly; sensing contact between the scarfing roll and the surface external the scarfing roll assembly with a first sensor; upon the sensed contact, recording a contact position of the scarfing roll using feedback from a second sensor when information is received from the first sensor that contact of the scarfing roll with the surface external the scarfing roll assembly has occurred; and controlling the scarfing roll lifting assembly to position the scarfing roll at an offset from the contact position corresponding to a desired scarf gap.

In some embodiments the method includes sensing contact between the scarfing roll and the external surface with a load cell. In other embodiments the method includes sensing contact between the scarfing roll and the external surface with one of a torque sensor and an optical sensor. In some embodiments the method includes sensing the contact position of the scarfing roll with an encoder.

The method may include moving the driven scarfing roll toward an outer forming surface of a driven forming drum onto which a fibrous material is deposited and sensing contact between the scarfing roll and the external surface comprises sensing contact between the scarfing roll and the outer forming surface.

The method may include a) moving the scarfing roll toward the outer forming surface of a forming drum; b) recording a contact position of the scarfing roll when information is received from the first sensor that contact of the scarfing roll with the forming surface has occurred; c) moving the scarfing roll away from the forming drum; d) rotating the forming drum to a new rotational position relative to the scarfing roll; e) repeating a) through d) to acquire contact positions at a plurality of rotational positions around a circumference of the forming drum; f) identifying a high point on the forming surface from the acquired contact positions; and g) moving the scarfing roll to a desired scarf gap position based on the identified high point.

In embodiments, the method includes controlling the scarfing roll lifting assembly to position the scarfing roll at an initial offset position from a surface external the scarfing roll assembly and subsequently move the driven scarfing roll to a contact position with the external surface.

The method may include controlling the scarfing roll lifting assembly to move the driven scarfing roll comprises moving the scarfing roll relative to a housing within which the scarfing roll is at least partially positioned.

In some embodiments, the method includes acquiring contact positions at a plurality of positions on the surface external the scarfing roll assembly, identifying a high point on the surface external the scarfing roll assembly from the acquired contact positions, and moving the scarfing roll to a desired scarf gap position based on the identified high point. In some embodiments the method includes identifying the high point as the contact position of the acquired contact positions corresponding to the minimum value.

BRIEF DESCRIPTION OF THE DRAWINGS

The drawings illustrate embodiments presently contemplated for carrying out the disclosure.

In the drawings.

DETAILED DESCRIPTION

While the present disclosure may be susceptible to embodiment in different forms, there is shown in the Figures, and will be described herein in detail, specific embodiments, with the understanding that the present disclosure is to be considered an exemplification of the principles of the present disclosure, and is not intended to limit the present disclosure to that as illustrated.

As such, references to a feature or aspect are intended to describe a feature or aspect of an example of the present disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

Referring first to FIGS. 1-4, a controllable automated gap control apparatus 10 is provided for setting a separation or scarf gap 12 between a scarfing roll 14 and an external surface, which is referred to herein as an outer forming surface 16 of a driven forming drum 18. The controllable automated gap control apparatus 10 is used to set an initial set position of the scarfing roll 14 relative to the outer forming surface 16 of the forming drum 18 such that a desired scarf gap 12 is provided during operation. While described herein with reference to a rotary forming drum 18, it is contemplated that the automated gap control apparatus 10 may be utilized in alternative types of forming systems, including a mat or screen system or other known air-laid systems, and thus be provided for setting a scarf gap 12 between the scarfing roll 14 and an external surface of the alternative forming system.

As is known in the art, the scarfing roll 14 scarfs a layer of a fibrous material 20 of an insert 22 which may be used as an absorbent core of a disposable products such as a diaper. In an embodiment, the controllable automated gap control apparatus 10, the scarfing roll 14 and the forming drum 18 are components of a forming apparatus 300 (FIG. 6), described herein, that forms disposable products. One example embodiment of the forming apparatus 300 is shown and described herein, however, the components of the forming apparatus 300 are not limited to specifically the embodiment shown herein.

Figure 1:
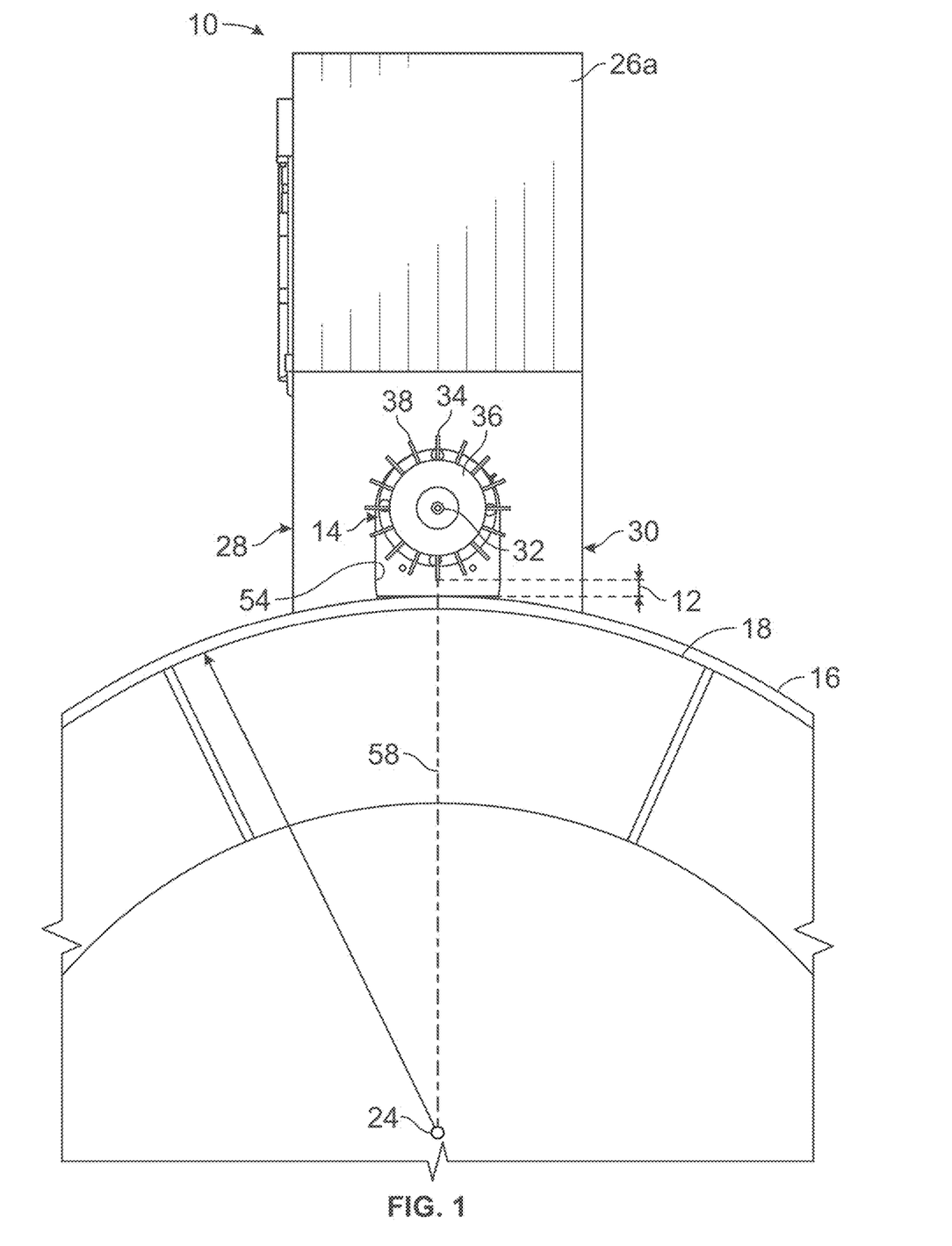
FIG. 1 is a front plan view of a scarfing roll positioned adjacent a forming drum, which is only partially shown, and a controllable automated gap control apparatus according to an exemplary embodiment.
Figure 2:
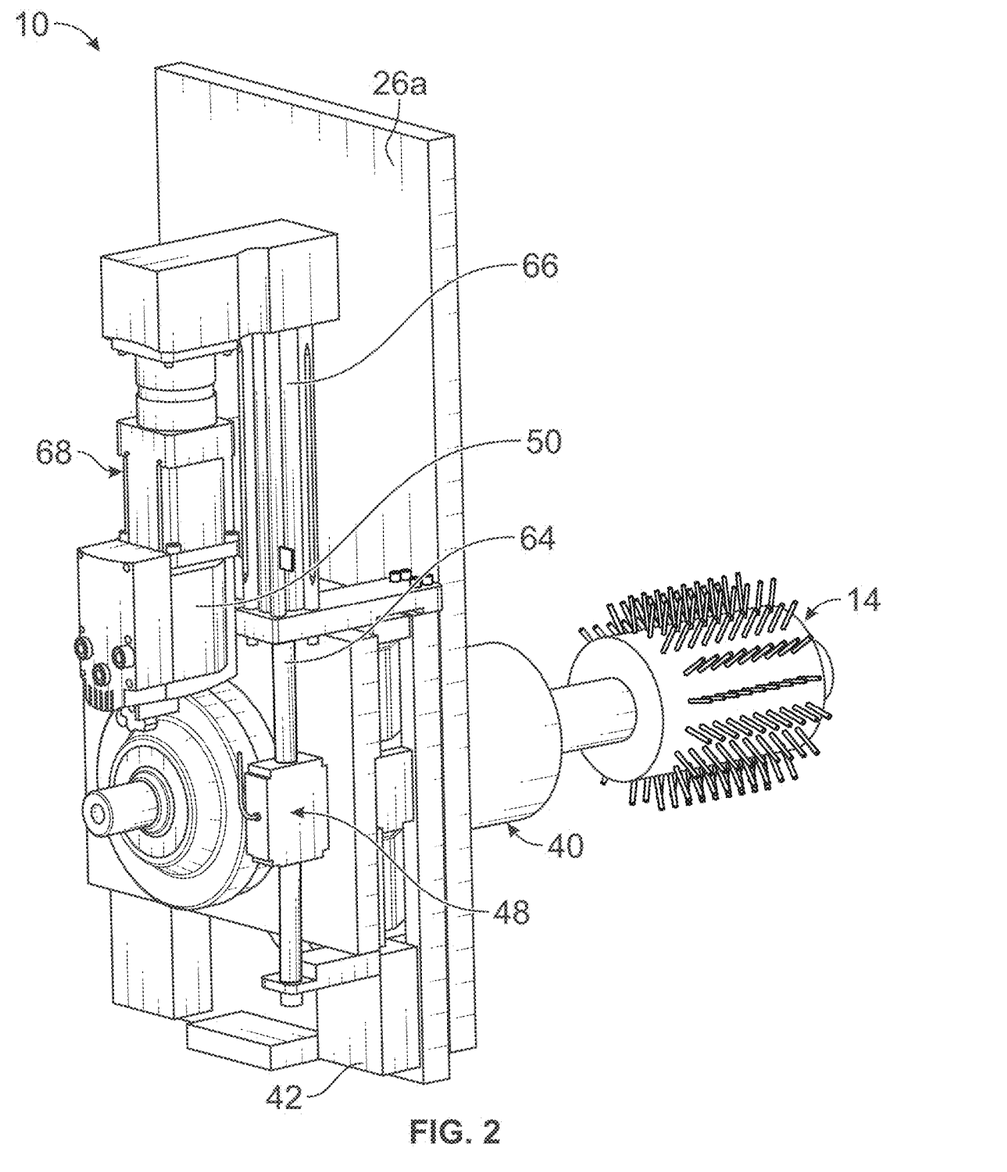
FIG. 2 is a perspective view of the scarfing roll and the controllable automated gap control apparatus.
Figure 3:
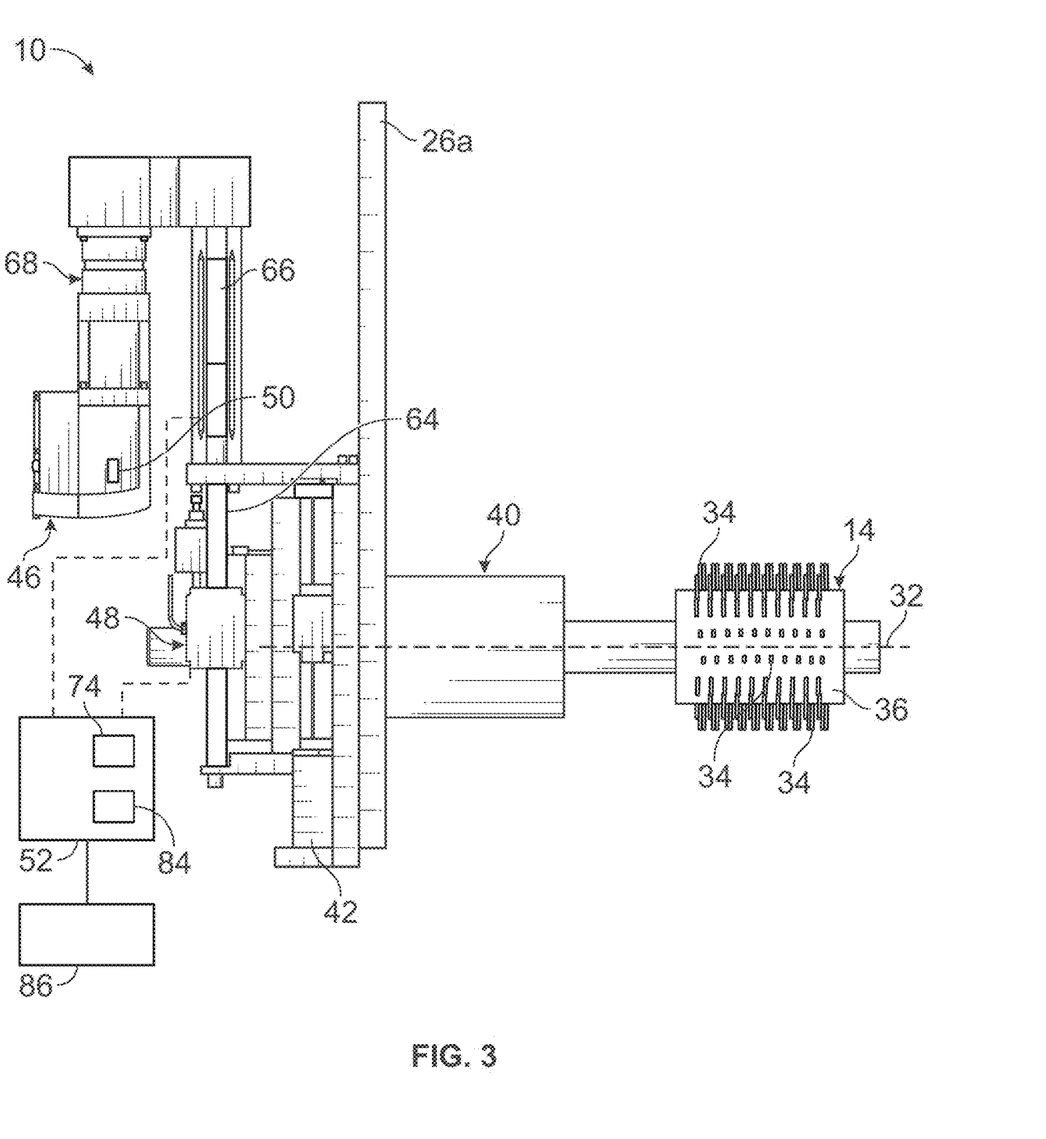
FIG. 3 is a side elevation view of the scarfing roll and the controllable automated gap control apparatus.
Figure 4:
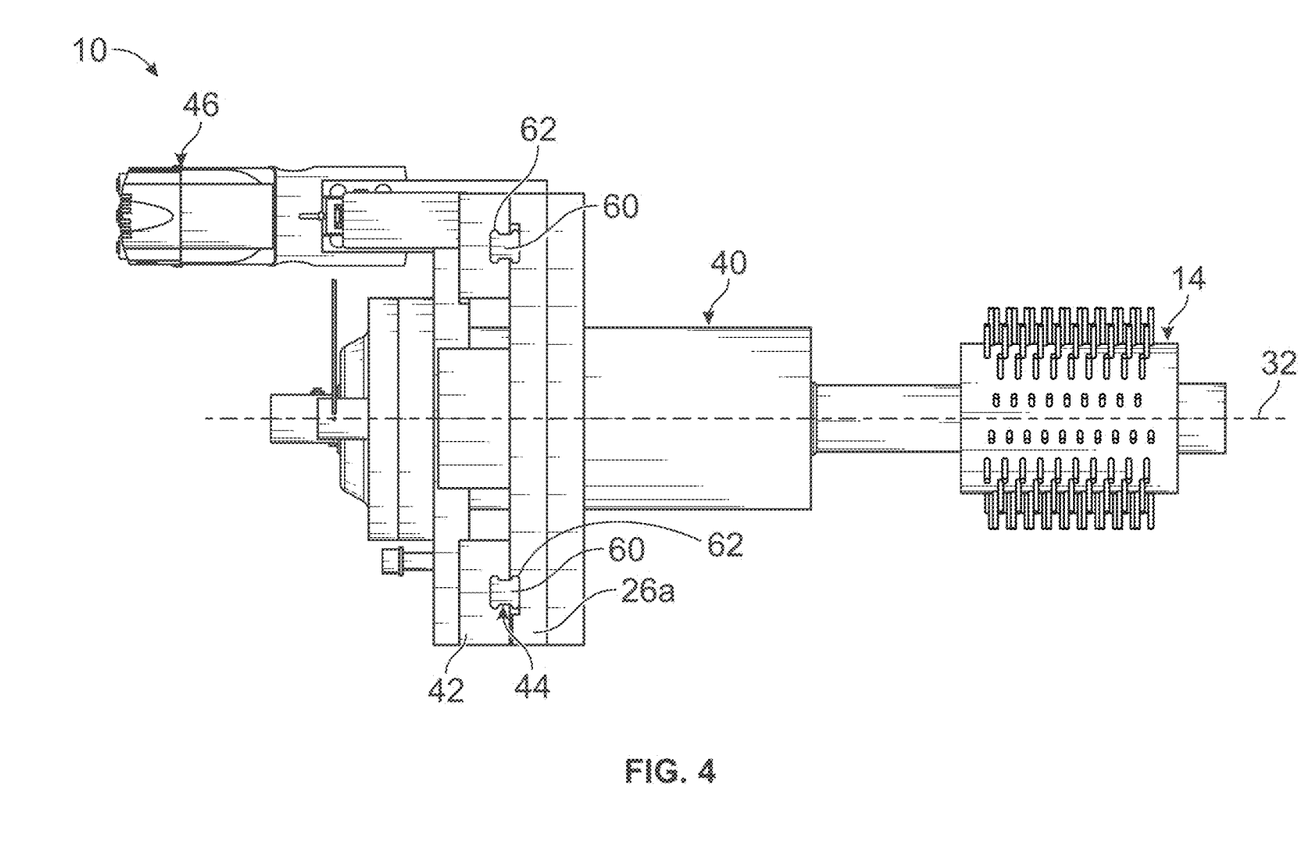
FIG. 4 is a bottom plan view of the scarfing roll and the controllable automated gap control apparatus.
Figure 5:
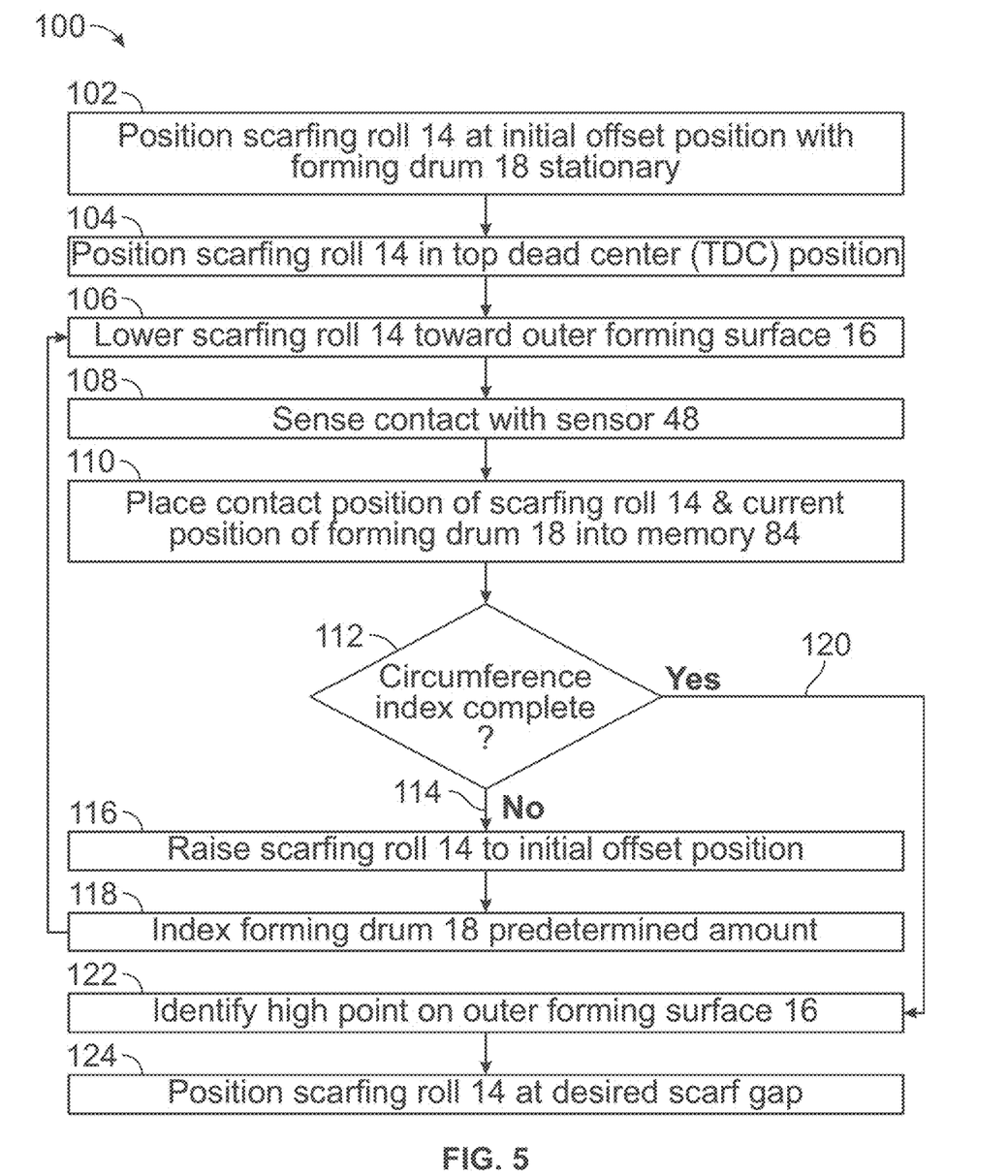
FIG. 5 is a flowchart of steps of method of operating the scarfing roll and the controllable automated gap control apparatus according to an exemplary embodiment.

A method of positioning the scarfing roll 14 relative to the forming drum 18 using the controllable automated gap control apparatus 10 is also provided with reference to FIG. 5. It is noted that the present controllable automated gap control apparatus 10 is described herein with respect to disposable hygiene products such as diapers, but as previously mentioned, can be applied to a wide variety of processes that utilize fiberized fluff mats including, as non-limiting examples, food pads and dry molded fiber products.

The outer forming surface 16 of the forming drum 18 is generally cylindrical and the forming drum 18 rotates about a rotational axis 24. Suitable forming drums 18 for producing a fibrous material 20 are well known in the art. The forming drum 18 may include a continuous three-dimensional fluff receiving pocket or depression or a plurality of discrete, three-dimensional fluff receiving pockets or depressions extending inward from the outer forming surface 16 thereof. As is known, outer forming surfaces of such forming drums 18 are not entirely concentric about their axes of rotation. Such non-circular portions are commonly called runouts. The present controllable automated gap control apparatus 10 and method prevent the scarfing roll 14 from contacting the outer forming surface 16 during operation.

The scarfing roll 14 is housed within a scarfing housing 26 (FIG. 6) and is movably positioned therewithin. Only the back wall 26a of scarfing housing 26 is shown in FIGS. 1-4 for clarity. The scarfing housing 26 provides an entrance opening 28 to allow the fibrous material 20 to enter into the scarfing housing 26 so that fibrous material 20 passes by the scarfing roll 14 and an opposite exit opening 30 to allow the fibrous material 20 to pass into the next component of the forming apparatus 300. The scarfing roll 14 extends from the back wall 26a over the forming drum 18.

The scarfing roll 14 has an a rotational axis 32, and typically, the rotational axis 32 of the scarfing roll is aligned substantially parallel to the rotational axis 24 of the forming drum 18. Scarfing rolls are well known in the art, and any conventional scarfing roll may be employed with the present invention. Suitable scarfing rolls are available from the Applicant. In the illustrated example, the scarfing roll 14 includes a plurality of scarfing pins or other scarfing elements 34, such as saw tooth blades, brushes, bars, and wire-wrapped saw tooth structures as non-limiting examples, which are operatively mounted and attached to a core member 36. The core member 36 may be generally cylindrical and the outer diameter of the scarfing roll 14 at the distal free tips 38 of the scarfing pins or other scarfing elements 34 define a generally cylindrical shape. The scarfing roll 14 may include a selected pattern array of scarfing pins or other scarfing elements 34 distributed along the outer surface of the core member 36. The scarfing pins or other scarfing elements 34 may be arranged in rows that extend along the axial direction of the scarfing roll 14, and may be distributed around the circumference of the scarfing roll 14 at substantially, equally spaced intervals. The scarfing roll 14 is operatively rotated by a suitable drive mechanism 40, such as an electrical motor, and can be rotated at any operative speed that is sufficient to provide the desired scarfing operation.

The controllable automated gap control apparatus 10 controls the position of the scarfing roll 14 and the drive mechanism 40 relative to the forming drum 18. The controllable automated gap control apparatus 10 includes a mount 42, which may be formed of a plate, on which the drive mechanism 40 and scarfing roll 14 are fixedly mounted, a slidable coupler 44 between the mount 42 and the back wall 26a of the scarfing housing 26, a lifting assembly 46 for raising or lowering the mount 42, the drive mechanism 40 and the scarfing roll 14 and a first sensor 48 which senses contact of the scarfing roll 14 with the outer forming surface 16 of the forming drum 18. The drive mechanism 40 is operatively coupled to a control unit 52 that is programmed to operate the lifting assembly 46 to position the scarfing roll 14 at a desired scarf gap. The drive mechanism 40 extends through an elongated opening 54 through the back wall 26a and the scarfing roll 14 and drive mechanism 40 can translate relative to the back wall 26a along an axis 56 of the opening 54 which extends radially from the rotational axis 24 of the forming drum 18 and which is defined along the length of the opening 54. In the illustrated embodiment, the scarfing roll 14 is cantilevered from the mount 42 and extends over the forming drum 18. Scarfing roll 14 may be simply supported in alternative embodiments. The scarfing roll 14 translates toward or away from the forming drum 18 when the controllable automated gap control apparatus 10 is activated.

In the embodiment as shown in FIGS. 1-4, the slidable coupler 44 (FIG. 4) is provided by rails 60 extending from the back wall 26a on each side of the elongated opening 54 and which are parallel to the axis, and mating channels 62 in the mount 42. As an alternative, the channels 62 can extend into the back wall 26a on each side of the elongated opening 54 parallel to the axis of the elongated opening 54, and the rails 60 extend from the mount 42. Other means for slidably coupling the back wall 26a and the mount 42 are within the scope of the present disclosure.

In an embodiment as shown in FIGS. 1-4, the lifting assembly 46 includes a piston 64 mounted within a cylinder 66 that can be raised or lowered under actuation by a driving mechanism 68, such as an electric motor, and a coupler assembly 70 between the end of the end of the piston 64 and the mount 42. The driving mechanism 68 is operatively coupled to the control unit 52. The control unit 52 is programmed to control the position of the piston 64 in response to information received from the first sensor 48. The piston 64 may be a screw. The cylinder 66 and the driving mechanism 68 are fixedly mounted to the back wall 26a. While described above as an electric motor, driving mechanism 68 may be any type of driving mechanism that converts rotary motion to linear motion or may be a linear motor in alternate embodiments.

In the embodiment as shown in FIGS. 1-4, the coupler assembly 70 includes the first sensor 48 which is operatively connected to the control unit 52 and provides information to a processor 74 of the control unit 52 when contact is registered. In the illustrated embodiment, first sensor 48 is a conventional load cell positioned between a shaft 72 forming part of the mount 42 and the end of the piston 64. The load cell, as is known in the art, registers when a load is placed thereon. In this embodiment, the first sensor 48 registers a load when a force is created when the scarfing roll 14 is moved into contact with the outer forming surface 16 of the forming drum 18. The first sensor 48 may alternatively be a sensor that detects contact between the scarfing roll 14 and the outer forming surface 16 via a detected flow of electricity therebetween.

In another embodiment, the first sensor 48 is a torque sensor that senses contact between the scarfing roll 14 and the forming drum 18 via a change in torque applied to the scarfing roll 14 while either the scarfing roll 14 or forming drum 18 are rotating, as further described with respect to the method below. Alternatively, first sensor 48 may be a sensor that visually determines that contact between the scarfing roll 14 and the outer forming surface 16 has occurred. Such a sensor can be a photo eye sensor, or similar optical sensor, operatively coupled to the processor 74. This first sensor 48 may be mounted on the back wall 26a of the scarfing housing 26, mounted within the tip of the scarfing pins or other scarfing elements 34, or mounted at an alternative advantageous location so that the contact of the scarfing roll 14 with the outer forming surface 16 of the forming drum 18 is sensed in each indexed position.

In yet another embodiment, the first sensor 48 is a calibrated distance sensor Referring again to FIGS. 1-4, the controllable automated gap control apparatus 10 tracks the relative position of the scarfing roll 14 using a second sensor 50 that detects motion of the scarfing roll 14. Second sensor 50 may be any known sensor capable of creating a distance signal from motion, such as, for example, an encoder. The second sensor 50 is operatively connected to the control unit 52 and provides information used by the processor 74 regarding the linear travel distance of the scarfing roll 14. The controllable automated gap control apparatus 10 is used to set a predetermined desired offset or scarf gap 12 between the scarfing roll 14 and the outer forming surface 16, and the scarf gap 12 is arranged to produce a desired thickness in the scarfed fibrous material 20.

A method 100 of operating the controllable automated gap control apparatus 10 is now described in accordance with an embodiment and in reference to FIG. 5. In step 102, the scarfing roll 14 is positioned at an initial offset distance from the outer forming surface 16 that is greater than any anticipated eccentricity of the outer forming surface 16.

Optionally, the control unit 52 may send a signal to actuate the drive mechanism 40 to position the scarfing roll 14 in a top dead center (TDC) position relative to the outer forming surface 16, step 104. In the TDC position, the scarfing pins or other scarfing elements 34 are positioned such that the TDC of the tip of at least one of the scarfing pins or other scarfing elements 34 is aligned with and positioned facing the forming drum 18. Next, the control unit 52 sends a signal to actuate the lifting assembly 46 to lower the mount 42, the drive mechanism 40, and the scarfing roll 14 toward the outer forming surface 16, step 106. In embodiments where first sensor 48 is a torque sensor, step 106 further includes slowly rotating one of the scarfing roll 14 or the forming drum 18 while holding the other component stationary. When the first sensor 48 senses contact of the distal free tips 38 of the scarfing pins or other scarfing elements 34 in the TDC position with the outer forming surface 16 (by force, optics, torque, conductivity, or other sensing means), step 108, a signal is sent to the processor 74.

The contact position of the scarfing roll 14, which is tracked based on output of second sensor 50, is then placed into memory 84, step 110, along with the current rotational position of the forming drum 18, which is determined by known means, such as an encoder [not shown] operatively coupled to the processor 74. This initial contact position is indicated as contact position CP1. The control unit 52 then sends a signal to actuate the lifting assembly 46 to raise the mount 42, the drive mechanism 40, and the scarfing roll 14 away from the outer forming surface 16 and back to the initial offset position, step 112. A check is then made to determine whether the contact position CPn of the scarfing roll 14 has been determined around the entire circumference of the outer forming surface 16 of the forming drum 18, step 114.

If indexing is not complete, 116, the control unit 52 sends a signal to index the forming drum 18 to rotate the forming drum 18 around its rotational axis 24 a predetermined amount, step 118. For example, the forming drum 18 may be indexed to rotate ten degrees. In another example, the forming drum 18 may be indexed to rotate one degree or any other predetermined rotational distance. With the scarfing roll 14 in the TDC position relative to the outer forming surface 16, the control unit 52 again sends a signal to actuate the lifting assembly 46 to lower the mount 42, the drive mechanism 40, and the scarfing roll 14 toward the outer forming surface 16, step 106. When the first sensor 48 again senses a force which indicates contact of the distal free tips 38 of the scarfing pins or other scarfing elements 34 in the TDC with the outer forming surface 16, step 108, another signal is sent to the processor 74. The contact position of the scarfing roll 14 along with the current rotational position of the forming drum 18, determined in the same manner described above, is then placed into memory 84, step 110. The second contact position is indicated as contact position CP2. The control unit 52 then sends a signal to actuate the lifting assembly 46 to raise the mount 42, the drive mechanism 40, and the scarfing roll 14 away from the outer forming surface 16 and back to the initial position, step 112.

This sequence of steps 106-118 is repeated until indexing is complete, 120, meaning that the contact position CPn of the scarfing roll 14 has been determined around the entire circumference of the outer forming surface 16. Thereafter, the control unit 52 references contact positions CP1 through CPn and identifies the drum location corresponding to the minimum contact position value as the drum high point ("HP") of the circumference of the outer forming surface 16, step 124. Processor 74 then references a desired scarf gap, which may be stored within memory 84, entered by a user, or otherwise input to the system, and control unit 52 sends a signal to actuate the lifting assembly 46 to position the scarfing roll 14 at a set operating position OP set at the desired scarf gap measured off the drum HP.

In use, the scarfing roll 14 rotates at a relatively high rate of speed to provide an operative scarfing motion. The scarfing roll 14 is rotated to contact the scarfing pins or other scarfing elements 34 with excess thickness of the fibrous material 20. Since the set position of the scarfing roll 14 is set relative to the determined high point of the circumference of the outer forming surface 16, the scarfing pins or other scarfing elements 34 will not contact the forming surface 16 during operation.

In use, the thickness of fibrous material 20 can be varied by programming the control unit 52 to lift the scarfing roll 14 away from the set operating position OP and then move the scarfing roll 14 back to the set operating position OP. The above-described sequence of lifting and lowering the scarfing roll 14 may also be to selectively vary the height of the formed fibrous material 20 (e.g., to form three-dimensional core structures) or to avoid material jams due caused by splices in the incoming web materials by providing feedback of known splice locations to the control unit 52.

The above-described method senses physical contact between the scarfing roll 14 and the external forming surface 16 and identifies the high point of the forming drum 18 by referencing the positional location of the scarfing roll 14 at each of a series of physical contact points on the forming drum 18. In yet another embodiment, the high point of the forming drum 18 may be determined using non-contact means, such as first sensor 48 provided in the form of a calibrated distance sensor (for example, an optical scanner) capable of detecting a distance to a given surface and/or mapping the topology of the outer forming surface 16 and identifying the high point of the forming drum 18 therefrom. In such an embodiment, steps 102-120 of method 100 would be omitted and the scanner utilized in step 122 to identify the high point of the forming drum 18.

Figure 6:
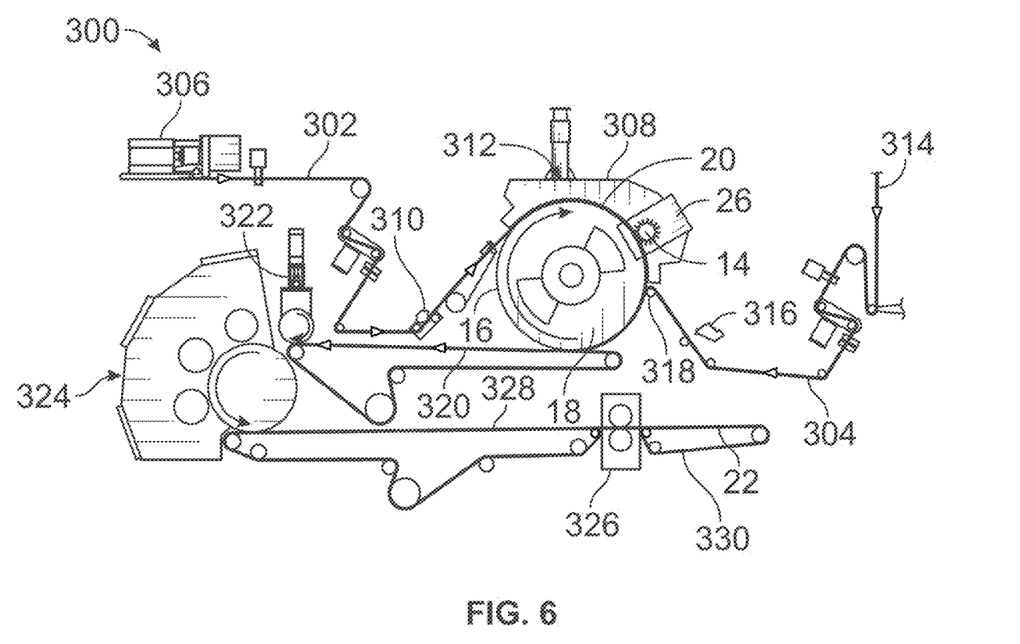
FIG. 6 is a schematic representation of a web processing apparatus incorporating a controllable automated gap control apparatus according to an exemplary embodiment.

An example of the forming apparatus 300 which forms the insert 22 is shown in FIG. 6. In an embodiment, the insert 22 includes a first sheet formed of a form-on web 302 material such as nonwoven material, tissue paper, or acquisition distribution layer (ADL), as non-limiting examples, a first adhesive layer (not shown), a layer of the absorbent fibrous material 20, a second adhesive layer (not shown), and a second sheet formed of a cover web 304 such as nonwoven material, tissue paper, or ADL, as non-limiting examples. The first adhesive layer is provided between the first sheet formed by the form-on web 302 material and the fibrous material 20, and the second adhesive layer is provided between the fibrous material 20 and the second sheet formed by the cover web 304. Longitudinally extending edge portions of the respective first and second sheets are adhesively secured to each other by the second adhesive layer. In other embodiments, forming apparatus 300 may form insert 22 as an unwrapped core structure comprising the fibrous material 20 absent the form-on web 302, cover web 304, and adhesive layers, which may be further processed downstream of the forming apparatus 300, or as a wrapped core structure comprising the fibrous material 20 with a single, wider web layer of which a portion of is positioned directly on the forming apparatus 300 during the forming process and another portion thereof is wrapped around the absorbent fibrous web 20 as the fibrous material 20 is formed.

With continued reference to FIG. 6, the form-on web 302 has a planar first surface and an opposite planar second surface, and the cover web 304 has a planar first surface and an opposite planar second surface. Each web 302, 304 defines a longitudinal axis which is parallel to the direction of movement of each web 302, 304 through the forming apparatus 300 and a lateral axis which is transverse to the direction of movement of each web 302, 304 through the forming apparatus 300.

The form-on web 302 is continuously fed from a source 306, such as a roll of material, to a core former 308. The form-on web 302 may be fed around a series of rollers as it proceeds from the source 306 to the core former 308. A first adhesive application station 310 is provided between the source 306 and the core former 308 and applies an adhesive layer to at least a portion of the second surface of the form-on web 302.

The material which forms the absorbent fibrous material 20 layer is fed into the core former 308. In the illustrated embodiment, the form-on web 302, having the adhesive layer applied thereto, passes between an outlet of a forming duct 312 of the core former 308 and the forming drum 18, which is rotating relative to the core former 308. As the form-on web 302 passes by the outlet, the fibrous material 20 layer is deposited onto the adhesive layer on the form-on web 302. The vacuum of the forming drum 18 is drawn through holes in the forming drum 18 and holds the form-on web 302 and fibrous material 20 layer against the forming drum 18.

The scarfing roll 14, which is now set to the desired scarf gap 12 relative to the outer forming surface 16 of the forming drum 18 via the controllable automated gap control apparatus 10, is downstream of the outlet of the forming duct 312 of the core former 308. The scarfing roll 14 continuously scarfs the fibrous material 20 layer to level the top thereof as the fibrous material 20 layer passes through the scarfing housing 26.

The cover web 304 is continuously fed from a source 314, such as a roll of material, downstream of the exit opening 30 of the scarfing housing. The cover web 304 may be fed around a series of rollers as it proceeds from the source 314 to the exit opening 30 of the scarfing housing 26. A second adhesive application station 316 is provided between the source 306 and the scarfing roll 14 and applies an adhesive layer to at least a portion of the first surface of the cover web 304.

The form-on web 302/fibrous material 20 layer/cover web 304 pass through a combining station 318 which is downstream of the exit of the scarf housing 26. In the embodiment as shown, the combining station 318 includes a drum and a nip roller. The nip roller rotates in coordination with the drum and the form-on web 302/fibrous material 20 layer/cover web 304 pass through the nip formed between the drum and the nip roller and this bonds the adhesive layer on the cover web 304 to the fibrous material 20 layer.

The bonded form-on web 302/fibrous material 20 layer/cover web 304 then moves onto and passes between the forming drum 18 and a conveyor 320, and translates along the conveyor 320 to an edge bonding unit 322 which is downstream of the combining station 318 which bonds longitudinally extending edge portions of the form-on web 302 and the cover web 304 together by the adhesive layer on the cover web 304. The edge bonding unit 322 may be movable roller(s) that press down onto the conveyor 320.

Thereafter, the combined form-on web 302/fibrous material 20 layer/cover web 304 passes through a debulking station 324 which may or may not include an embossing roll and which is downstream of the edge bonding unit 322 to debulk, which at least partially compresses the fibrous material 20 layer, thereby increasing its density and structural integrity.

The combined form-on web 302/fibrous material 20 layer/cover web 304 exits the debulking station 324 and is conveyed to a cutting unit 326 by a conveyor 328 which is downstream of the debulking and embossing station 324. The cutting unit 326 severs the combined form-on web 302/fibrous material 20 layer/cover web 304 by cutting in the transverse direction to form individual inserts 22. Thereafter, the individual inserts 22 are transported for example by a conveyor 330 to another apparatus (not shown) for completion of the disposable product in which the inserts 22 are encapsulated between a back sheet formed of an impermeable material and at least one hydrophilic top sheet. Other layers may be provided in the final disposable product.

The foregoing is considered as illustrative only of the principles of the disclosure. Furthermore, since numerous modifications and changes will readily occur to those skilled in the art, it is not desired to limit the disclosure to the exact construction and operation shown and described. While the preferred embodiment has been described, the details may be changed without departing from the disclosure, which is defined by the claims.

What is claimed is:

1. A scarfing assembly for scarfing a fibrous material, the scarfing assembly comprising:
   a moveable mount;
   a driven scarfing roll coupled to the moveable mount;
   a scarfing roll lifting assembly coupled to the moveable mount;
   a first sensor configured to sense contact between the scarfing roll and an external surface;
   a second sensor configured to sense position of the scarfing roll when information is received from the first sensor that contact of the scarfing roll with the external surface has occurred; and
   a control unit programmed to operate the scarfing roll lifting assembly to position the scarfing roll at a desired scarf gap measured from the contact position.

2. The scarfing assembly of claim 1, wherein the scarfing roll is positioned at least partially within a housing; and
   wherein the scarfing roll lifting assembly causes movement of the scarfing roll relative to the housing.

3. The scarfing assembly of claim 1, wherein the first sensor comprises a load cell.

4. The scarfing assembly of claim 1, wherein the first sensor comprises one of an optical sensor and a torque sensor.

5. The scarfing assembly of claim 1, wherein the second sensor comprises an encoder.

6. The scarfing assembly of claim 1, further comprising a driven forming drum positioned proximate the scarfing roll and having a forming surface onto which a fibrous material is deposited; and
wherein the external surface is an outer forming surface of the driven forming drum.

7. The scarfing assembly of claim 6, wherein the first sensor is configured to sense contact between the scarfing roll and the outer forming surface;
wherein the second sensor is configured to sense a contact position where the scarfing roll is in contact with the outer forming surface; and
wherein the control unit is further programmed to control the scarfing roll lifting assembly to position the scarfing roll at the desired scarf gap measured off the contact position.

8. The scarfing assembly of claim 7, wherein the control unit is further programmed to:
a) move the scarfing roll toward the forming drum;
b) record a contact position of the scarfing roll when information is received from the first sensor that contact of the scarfing roll with the outer forming surface has occurred;
c) move the scarfing roll away from the forming drum;
d) rotate the forming drum to a new rotational position relative to the scarfing roll;
e) repeat a) through d) to acquire contact positions at a plurality of rotational positions around a circumference of the forming drum;
f) identify a high point on the forming surface from the acquired contact positions; and
g) move the scarfing roll to a desired scarf gap position based on the identified high point.

9. The scarfing assembly of claim 7, wherein the control unit is programmed to acquire contact positions at a plurality of rotational positions around the entire circumference of the forming drum.

10. The scarfing assembly of claim 7, wherein the control unit is programmed to identify the high point as the minimum value of the acquired contact positions.

11. The scarfing assembly of claim 1, wherein the desired scarf gap is a thickness of an absorbent core.

12. A method of automated gap control of a scarfing roll assembly for a fibrous material, the method comprising:
controlling a scarfing roll lifting assembly to move a driven scarfing roll toward a surface external the scarfing roll assembly;
sensing contact between the scarfing roll and the surface external the scarfing roll assembly with a first sensor;
upon the sensed contact, recording a contact position of the scarfing roll using feedback from a second sensor when information is received from the first sensor that contact of the scarfing roll with the surface external the scarfing roll assembly has occurred; and
controlling the scarfing roll lifting assembly to position the scarfing roll at an offset from the contact position corresponding to a desired scarf gap.

13. The method of claim 12, further comprising sensing contact between the scarfing roll and the external surface with a load cell.

14. The method of claim 12, further comprising:
moving the driven scarfing roll toward an outer forming surface of a driven forming drum onto which a fibrous material is deposited; and
wherein the step of sensing contact between the scarfing roll and the external surface comprises sensing contact between the scarfing roll and the outer forming surface.

15. The method of claim 14, further comprising:
a) moving the scarfing roll toward the forming drum;
b) recording a contact position of the scarfing roll when information is received from the first sensor that contact of the scarfing roll with the forming surface has occurred;
c) moving the scarfing roll away from the forming drum;
d) rotating the forming drum to a new rotational position relative to the scarfing roll;
e) repeating a) through d) to acquire contact positions at a plurality of rotational positions around a circumference of the forming drum;
f) identifying a high point on the forming surface from the acquired contact positions; and
g) moving the scarfing roll to a desired scarf gap position based on the identified high point.

16. The method of claim 12, further comprising controlling the scarfing roll lifting assembly to:
position the scarfing roll at an initial offset position from a surface external the scarfing roll assembly; and
subsequently move the driven scarfing roll to a contact position with the external surface.

17. The method of claim 12, wherein controlling the scarfing roll lifting assembly to move the driven scarfing roll comprises moving the scarfing roll relative to a housing within which the scarfing roll is at least partially positioned.

18. The method of claim 12, further comprising:
acquiring contact positions at a plurality of positions on the surface external the scarfing roll assembly;
identifying a high point on the surface external the scarfing roll assembly from the acquired contact positions; and
moving the scarfing roll to a desired scarf gap position based on the identified high point.

19. The method of claim 18, further comprising identifying the high point as the contact position of the acquired contact positions corresponding to the minimum value.

20. The method of claim 12, further comprising sensing the contact position of the scarfing roll with an encoder.

21. The method of claim 12, further comprising sensing contact between the scarfing roll and the external surface with one of a torque sensor and an optical sensor.

* * * * *